Dec. 2, 1958 K. F. SCHLICHTING 2,862,606
FISH-FEEDING METHOD AND APPARATUS

Filed Nov. 8, 1955 2 Sheets-Sheet 1

Inventor
K. F. Schlichting
By Richards & Geier
Attorneys

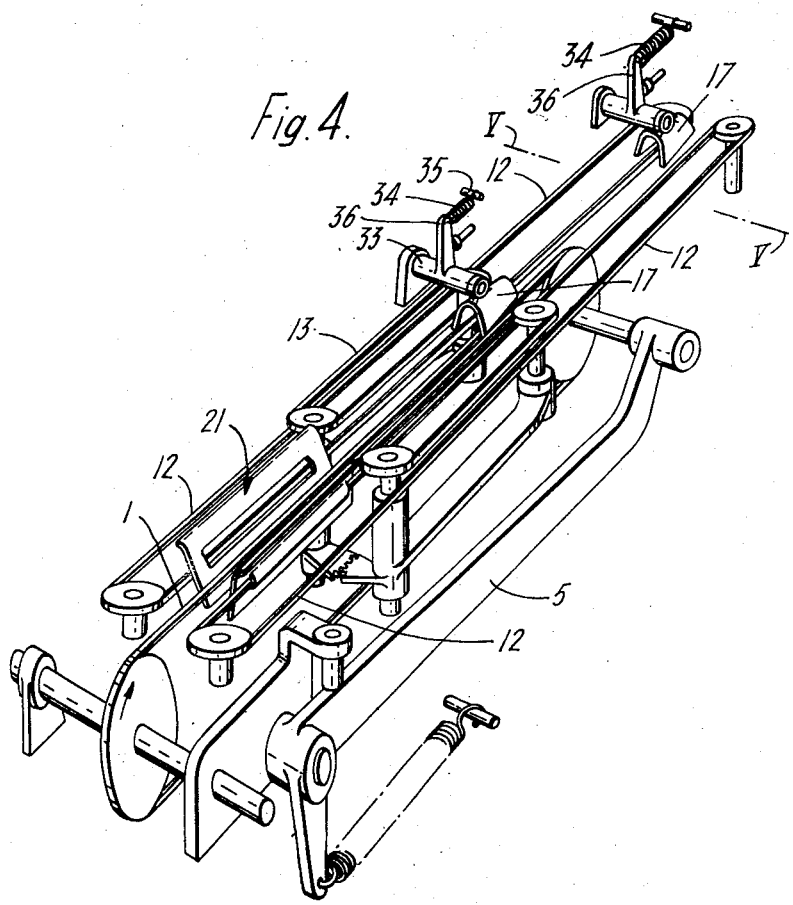
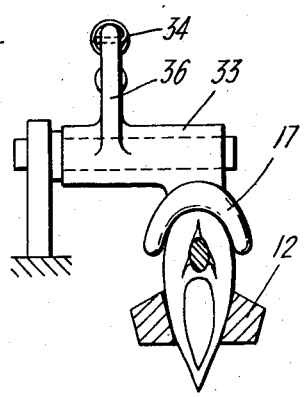

United States Patent Office 2,862,606
Patented Dec. 2, 1958

2,862,606

FISH-FEEDING METHOD AND APPARATUS

Karl Friedrich Schlichting, Lubeck, Germany, assignor to Nordischer Maschinenbau Rud. Baader, Lubeck, Germany Application November 8, 1955, Serial No. 545,702

Claims priority, application Germany November 9, 1954

5 Claims. (Cl. 198—165)

Fish-dressing machines to-day must be able to produce dressed fish of good quality at a high rate, and it is well known that these requirements can be satisfied only by perfect guiding of the fish at all stages. An essential is that the fish should be properly introduced into the working path proper of the machine. The fish are now commonly both supplied to the machine and introduced into the working path by an endless conveyor which receives the fish from a supply conveyor at right angles to the receiving conveyor at a point where stationary walls extend upwards on each side of the receiving conveyor. This receiving conveyor is narrow, and it is rare that the fish can be delivered onto it in exactly the position required. Rather it may happen that the fish is caught between the side walls and no part of it touches the receiving conveyor at all. This fish may then be knocked downwards onto the conveyor by the next fish and carried forward in a completely wrong position, or two or more fish may be conveyed together by the receiving conveyor to the first working tool. This may lead to complete clogging of the working tool and the guides commonly used to present a fish to a working tool. An object of this invention is to eliminate the above drawbacks.

According to this invention the fish are fed into a receiving device in which conveying elements both engage the fish to carry it away immediately, so that a clear space is left for the next fish, and set upright any fish not supplied upright. The term "upright" is used to indicate that the central longitudinal plane of the fish is vertical. Once a fish is travelling upright it may be centred both laterally and vertically in relation to a working tool by which it is to be engaged, but if the fish is not upright, i. e., is in a wrong position, guides may be incapable of adjusting its position. This adjustment is effected according to the invention by employing conveying elements which turn the fish about its longitudinal axis while it is travelling.

Thus, whether or not the fish lies in the right position when it enters the receiving device it is immediately carried out of the path of the next oncoming fish, and then can be accurately centred.

Preferably the fish fall into the receiving device belly downwards and head-end first.

The fish may be dropped into the receiving device by hand, but the preferred aparatus according to the invention is part of a complete machine including an endless supply conveyor from which the fish fall.

The preferred apparatus according to the invention comprises a trough with walls that are inclined downwardly towards each other and conveying elements operative to engage and carry out of the trough each fish fed to it, and to set the fish upright if necessary.

A novel feature of the invention is that the walls of the trough are at least partly formed by conveying elements, which are preferably endless band conveyors, the base of the trough being formed by the receiving conveyor.

In the preferred construction the conveyors which form the moving walls of the trough may run immediately inside fixed walls or immediately above or below fixed walls or immediately outside fixed walls having openings through which the conveyors engage the fish.

The fish dropped into the receiving device by the supply conveyor or otherwise may have had their heads or their tails or both cut off, or the dressing machine into which they are introduced may serve to perform either or both of these operations.

Some devices according to the invention are shown by way of example in the accompanying diagrammatic drawings, those parts not necessary for understanding of the invention being omitted. In these drawings:

Figure 4 is a perspective view of a second apparatus; and

Figure 5 is a cross-section taken on the line V—V in Figure 4.

Figure 1:
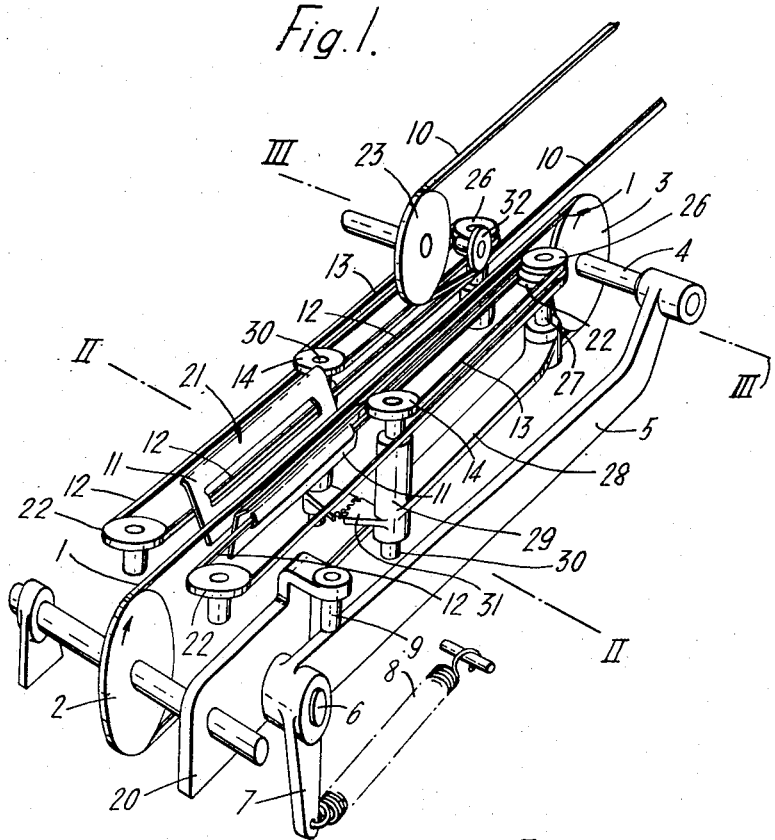
Figure 1 is a perspective view of one apparatus.
Figure 2:
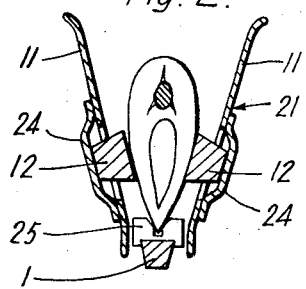
Figure 2 and 3 are cross-sections respectively taken on the line II—II and III—III in Figure 1.
Figure 3:
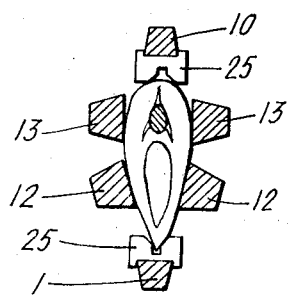

Referring first to Figures 1 to 3, an endless band conveyor 1 constitutes the receiving conveyor for feeding the fish to a working tool in a dressing machine not shown. It runs over wheels 2 and 3. The wheel 3 is mounted on a shaft 4, which is itself carried by a long lever 5 pivoted about a pin 6 in a fixed frame part 20. The lever 5 has a tail 7 subjected to the action of a spring 8, and is limited in its rocking movement under the action of the spring by an adjustable stop 9.

The fish are successively dropped into a receiving trough 21 having fixed walls 11 by a supply conveyor not shown, the discharge end of which terminates above the mouth of the trough. The fish are put on the supply conveyor with their bellies leading and their head-ends facing the direction of movement of the conveyor 1, and they fall off the supply conveyor into the trough 21. The walls 11 of the trough are inclined downwardly towards one another, and the bottom of the trough is formed by the conveyor 1. If the fish fall into the trough exactly as desired, their bellies come to rest on the conveyor 1. The trough has two moving walls constituted by horizontal endless band conveyors 12 running immediately outside the walls 11 and engaging the fish through openings in those walls. The conveyors 12 run round wheels 22 turning on vertical axes and extend beyond the trough 21. As they come opposite the openings in the trough walls 11 they run within casing members 24 secured to the outer surfaces of the walls and are urged inwards under cam action exerted by these members. These conveyors 12 engage the fish immediately as it enters the trough and in combination with the conveyor 1 serve consistently to carry any fish out of the trough directly as it is fed into it by the supply conveyor. Moreover, if the fish is not upright, i. e. not in the position shown in Fig. 2 as it drops into the trough, the conveyors 12 serve to turn it about its longitudinal axis while they engage and carry the fish, so that it is in the correct position on leaving them.

The fish carried onwards by the conveyor 1 is engaged and laterally centred by two short endless band conveyors 13 which run round wheels 14 and 26. As the fish leave the conveyors 13 they are engaged by an upper guide in the form of yet another conveyor 10 which runs round wheels 23 (only one being shown), these wheels turning about horizontal axes. The conveyer 10 serves to centre the fish vertically. Because fish vary in size those parts of the various conveyors that perform this guiding should be allowed to yield. For this purpose the wheels 22 and 26 are mounted in pairs on shafts 27 themselves carried in arms 28 which project from sleeves 29 surrounding the shafts 30 of the wheels 14. The shafts 30 are carried in bearings not shown, and the sleeves 29 can turn round them. The conveyors 13 are inclined towards one another so that a large fish will tend to spread them apart, and this spreading movement is permitted by rocking of the arms 28 and sleeves 29. The sleeves 29 have additional arms 31 with intermeshing teeth so that the sleeves must always turn synchronously, and thus accurate lateral centring of the fish is ensured. In order to allow large fish to be centred vertically, the shaft 4 of the conveyor 1 is free to move downwards, that is to say, to allow the end of the conveyor to yield against the action of the spring 8. The conveyor 10 is pressed vertically downwards against the fish by a roller 32, the shaft of which can yield upwards against the action of a spring not shown. It will be seen that at the point where the fish is engaged by the conveyor 10 it is in fact simultaneously held by four yieldable guides constituted by the four conveyors and these lead it in exactly the right position to further guides, not shown, which with the conveyor 10 serve to present it accurately to a working tool of the dressing machine.

Figure 1 is somewhat diagrammatic, and in particular shows the conveyors 1 and 10 as simple bands. To enable these conveyors respectively to engage the belly and back of each fish, each in fact carries gripping members 25 shown in Figures 2 and 3.

In the modification shown in Figures 4 and 5 the trough 21 and conveyors 1 and 13 are the same as before, but the conveyors 12 extend much further beyond the trough. The upper guide for the vertical centring is not a conveyor but rather consists of a series of guides 17 of inverted U-shape which are mounted to yield upwardly, being carried by sleeves 33 which can rock against springs 34. Each spring is anchored at one end to a fixed point 35 and at the other end to an arm 36 on the sleeve 34. Only two such guides 17 are shown.

I claim:

1. A fish-feeding apparatus, comprising an endless movable conveyor band, two fixed walls extending downwardly toward each other and toward said band to form a fish-receiving trough, said band constituting the bottom of said trough, said walls having elongated openings extending in the direction of said band, endless bands movable within said openings, means carried by said walls and engaging portions of the last-mentioned bands located within said openings for maintaining said band portions at a closer distance from each other than that of said openings, whereby a fish body in said trough is engaged and transported by the bands, two other endless bands constituting a continuation of said walls and extending parallel to the first-mentioned band for engaging and transporting a fish body emerging from said trough, and means located above the first-mentioned band beyond said trough and in the path of movement of the fish body for pressing the fish body against said bands.

2. An apparatus in accordance with claim 1, wherein the last-mentioned means comprise a series of guides of inverted U-shape, and means yieldably supporting said guides.

3. An apparatus in accordance with claim 1, wherein the last-mentioned means comprise an endless conveyor, a roller pressing downwardly upon said conveyor, and means resiliently supporting said roller.

4. An apparatus in accordance with claim 3, comprising gripping members carried by the first-mentioned band and said endless conveyor.

5. A fish-feeding apparatus, comprising an endless movable conveyor band, wheels carrying said band, means resiliently supporting one of said wheels, two fixed walls extending downwardly toward each other and toward said band to form a fish-receiving trough, said band constituting the bottom of said trough, said walls having elongated openings extending in the direction of said band, endless bands movable within said openings, means carried by said walls and engaging portions of the last-mentioned bands located within said openings for maintaining said band portions at a closer distance from each other than that of said openings, whereby a fish body in said trough is engaged and transported by the bands, pairs of wheels carrying the last-mentioned bands, two other endless bands constituting a continuation of said walls and extending parallel to the first-mentioned band for engaging and transporting a fish body emerging from said trough, pairs of wheels carrying the last-mentioned bands, the last-mentioned bands being inclined toward each other, two shafts, each of said shafts carrying a wheel belonging to the first-mentioned pairs of wheels and a wheel belonging to the second-mentioned pairs of wheels, a separate arm carrying each shaft, a separate sleeve perpendicularly mounted upon each arm, a separate pivot extending through the sleeve and carrying a wheel belonging to the first-mentioned pairs of wheels, arms having intermeshing teeth carried by the sleeves, and means located above the first-mentioned band beyond said trough and in the path of movement of the fish body for pressing the fish body against said bands.

References Cited in the file of this patent

UNITED STATES PATENTS

| 2,140,575 | David et al. | Dec. 20, 1938 |
| 2,581,432 | Nordquist | Jan. 8, 1952 |
| 2,669,378 | Carruthers | Feb. 16, 1954 |
| 2,738,051 | Beyer | Mar. 13, 1956 |

FOREIGN PATENTS

| 478,521 | Canada | Nov. 13, 1951 |
| 701,419 | Great Britain | Dec. 23, 1953 |